US008713174B2

(12) United States Patent
Sobotka et al.

(10) Patent No.: US 8,713,174 B2
(45) Date of Patent: Apr. 29, 2014

(54) MATCHING ENGINE FOR COMPARING DATA FEEDS WITH USER PROFILE CRITERIA

(75) Inventors: David C. Sobotka, Redwood City, CA (US); Christopher E. Austin-Lane, Takoma Park, MD (US); Vijay K. Eranti, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/620,557

(22) Filed: Sep. 14, 2012

(65) Prior Publication Data

US 2013/0073723 A1     Mar. 21, 2013

Related U.S. Application Data

(63) Continuation of application No. 13/401,525, filed on Feb. 21, 2012, which is a continuation of application No. 11/385,368, filed on Mar. 21, 2006, now Pat. No. 8,122,087.

(51) Int. Cl.
*G06F 15/16* (2006.01)
*G06F 15/173* (2006.01)

(52) U.S. Cl.
USPC ............................ 709/224; 709/236; 709/242

(58) Field of Classification Search
CPC ............ H04L 12/1859; H04L 12/2408; H04L 12/2602; H04L 29/06176; H04L 29/080306; H04L 29/08045; H04L 29/08702; H04L 29/08756; H04L 41/0604; H04L 43/045
USPC .......................................................... 709/224
See application file for complete search history.

(56) References Cited

U.S. PATENT DOCUMENTS

| | | | |
|---|---|---|---|
| 6,631,402 B1 | 10/2003 | Devine et al. |
| 6,694,362 B1 | 2/2004 | Secor et al. |
| 6,728,715 B1 | 4/2004 | Astley et al. |
| 6,785,713 B1 | 8/2004 | Freeman et al. |
| 6,826,606 B2 | 11/2004 | Freeman et al. |
| 6,850,893 B2 | 2/2005 | Lipkin et al. |
| 7,200,675 B2 | 4/2007 | Wang et al. |
| 7,203,665 B2 | 4/2007 | Donner |
| 7,216,179 B2 | 5/2007 | Ott et al. |

(Continued)

OTHER PUBLICATIONS

Carzaniga, Antonio et al. "Design and Evaluation of a Wide-Area Event Notification Service," Journal ACM Transactions on Computer Systems (TOCS), vol. 19, Issue 3, Aug. 2001, pp. 332-383.*

(Continued)

*Primary Examiner* — Melvin H Pollack
(74) *Attorney, Agent, or Firm* — Keller Jolley Preece (57) ABSTRACT

An event notification matching system, including an event matching table forming a plurality of nodes. Each node is assigned a subscriber request value and contains identifiers for one or more subscribers to be notified at the occurrence of an event relating to the subscriber request value. The event notification matching system may also include a table index. The table index receives input values from an event processing module and selects one or more of the nodes that have subscriber request values corresponding to the received input values. The event processor receives event data from a predetermined source, and formats the input values to simplify the operations performed by the event matching table. The event notification matching system is configured such that the event data need not be compared to non-matching nodes in the event matching table.

20 Claims, 4 Drawing Sheets

(56) References Cited

U.S. PATENT DOCUMENTS

| | | | |
|---|---|---|---|
| 7,239,614 B2* | 7/2007 | Novaes | 370/256 |
| 7,254,579 B2 | 8/2007 | Cabrera et al. | |
| 7,284,245 B2* | 10/2007 | Novik et al. | 719/310 |
| 7,346,682 B2 | 3/2008 | Basani et al. | |
| 7,349,980 B1 | 3/2008 | Darugar et al. | |
| 7,408,441 B2* | 8/2008 | Korzeniowski | 340/286.02 |
| 7,437,375 B2 | 10/2008 | Borthakur et al. | |
| 7,454,462 B2 | 11/2008 | Belfiore et al. | |
| 7,559,065 B1* | 7/2009 | Sosnovsky et al. | 719/318 |
| 7,577,750 B2 | 8/2009 | Shen et al. | |
| 7,587,517 B2 | 9/2009 | Huang et al. | |
| 7,596,523 B2 | 9/2009 | Sobel et al. | |
| 7,627,570 B2* | 12/2009 | Bosloy et al. | 1/1 |
| 7,627,603 B2* | 12/2009 | Rosenblum et al. | 1/1 |
| 7,634,653 B2* | 12/2009 | Horita et al. | 713/156 |
| 7,640,263 B2* | 12/2009 | Sundararajan et al. | 1/1 |
| 7,644,161 B1* | 1/2010 | Graupner et al. | 709/226 |
| 7,647,329 B1 | 1/2010 | Fischman et al. | |
| 7,657,450 B2* | 2/2010 | Amit et al. | 705/7.26 |
| 7,668,794 B2* | 2/2010 | Wang et al. | 706/47 |
| 7,680,951 B1* | 3/2010 | Kulik | 709/238 |
| 7,685,183 B2 | 3/2010 | Pace et al. | |
| 7,702,744 B2* | 4/2010 | Hoshiai et al. | 709/217 |
| 7,710,988 B1 | 5/2010 | Tripathi et al. | |
| 7,716,180 B2 | 5/2010 | Vermeulen et al. | |
| 7,721,152 B1* | 5/2010 | Joshi et al. | 714/25 |
| 7,739,614 B1* | 6/2010 | Hackworth | 715/771 |
| 7,743,137 B2* | 6/2010 | Sarwono et al. | 709/224 |
| 7,840,658 B2 | 11/2010 | Sinn | |
| 7,853,643 B1 | 12/2010 | Martinez et al. | |
| 7,876,754 B2* | 1/2011 | Novaes | 370/390 |
| 7,925,729 B2 | 4/2011 | Bush et al. | |
| 7,966,369 B1* | 6/2011 | Briere et al. | 709/204 |
| 7,984,075 B2* | 7/2011 | Aguilar et al. | 707/802 |
| 7,984,453 B2* | 7/2011 | Alverson et al. | 719/318 |
| 8,090,667 B2* | 1/2012 | Stewart et al. | 707/629 |
| 8,090,809 B2* | 1/2012 | Tan et al. | 709/223 |
| 8,122,087 B2* | 2/2012 | Sobotka et al. | 709/206 |
| 8,131,718 B2* | 3/2012 | Tran | 707/732 |
| 8,150,815 B2* | 4/2012 | Vian et al. | 707/693 |
| 8,234,346 B2* | 7/2012 | Rao et al. | 709/207 |
| 8,468,250 B2* | 6/2013 | Hopkins | 709/226 |
| 8,472,945 B2* | 6/2013 | O'Neill et al. | 455/428 |
| 2003/0195946 A1 | 10/2003 | Yang | |
| 2004/0002958 A1* | 1/2004 | Seshadri et al. | 707/3 |
| 2004/0010546 A1 | 1/2004 | Klug et al. | |
| 2004/0122942 A1 | 6/2004 | Green et al. | |
| 2005/0027845 A1 | 2/2005 | Secor et al. | |
| 2005/0086469 A1 | 4/2005 | Dunagan et al. | |
| 2005/0267896 A1 | 12/2005 | Goodman et al. | |
| 2006/0059165 A1 | 3/2006 | Bosloy et al. | |
| 2006/0161554 A1 | 7/2006 | Lucovsky et al. | |
| 2006/0168006 A1 | 7/2006 | Shannon et al. | |
| 2006/0190588 A1 | 8/2006 | Nakayama et al. | |
| 2007/0140262 A1 | 6/2007 | Wang | |
| 2007/0156656 A1* | 7/2007 | Pather et al. | 707/3 |
| 2007/0168550 A1* | 7/2007 | Wang et al. | 709/238 |
| 2007/0174242 A1* | 7/2007 | Josifovski et al. | 707/3 |
| 2007/0198629 A1 | 8/2007 | Ganguly et al. | |
| 2008/0288655 A1* | 11/2008 | Zhao et al. | 709/238 |
| 2010/0312768 A1* | 12/2010 | Shear et al. | 707/740 |
| 2012/0191849 A1* | 7/2012 | Hopkins | 709/224 |
| 2012/0254088 A9* | 10/2012 | Kass et al. | 706/46 |
| 2012/0297058 A1 | 11/2012 | Sobotka | |

OTHER PUBLICATIONS

Casati, Fabio and Shan, Ming-Chien. "Dynamic and Adaptive COmposition of e-Services," Information Systems, 12$^{th}$ Intl Conference on Advanced Systems Engineering, vol. 26, Issue 3, May 2001, pp. 143-163.*

Pardo-Castellone, G. OMG Data-Distribution Service: Architectural Overview, 23$^{rd}$ Intl Conference on Distributed Computing Workshops, 2003, pp. 200-206.*

Banga, Gaurav et al. "A Scalable and Explicit Event Delivery Mechanism for UNIX," Proceedings of the USENIX Annual Technical Conference, Jun. 6-11, 1999.*

Rodriguez, Adolfo et al. "MACEDON: Methodology for Automatically Creating, Evaluating and Designing Overlay Networks," NSDI 2004.*

Aberer, Karl et al. "Building Content-Based Publish/Subscribe Systems with Distributed Hash Tables," Databases, Information SYstems and Peer to Peer Computing, Lecture Notes in COmputer Science, vol. 2944, 2004, pp. 138-152.*

Banavar, G. et al. "An Efficient Multicast Protocol for Content-Based Publish-Subscrive Systems," 19$^{th}$ IEEE Intl Conference on Distributed Computing Systems, 1999, pp. 262-272.*

Batini, Carlo et al. "Generic Constraints for Content-Based Publish/ Subscribe," Cooperative Information Systems, Lecture Notes on Computer Science, vol. 2172, 2001, pp. 211-225.*

A. Carzaniga, Architectures for an Event Notification Service Scalable to Wide-area Networks, Dec. 1998, Politecnico Di Milano, PhD Thesis, all pages.

Wang, Yi-Min et al. "Subscription Partitioning and Routing in Content-Based Publish/Subscribe Systems," DISC 2002, pp. 1-8.

Riabov, A. et al. "New Algorithms for Content-Based Publication-Subscription Systems," Proceedings of the 23rd International Conference on Distributed Computing Systems, May 22, 2003, pp. 678-686.

Banavar, G. et al. "An Efficient Multicast Protocol for Content-Based Publish Subscribe Systems," International Conference on Distributed Computing Systems, Jun. 1999, pp. 262-272.

Pereira, Joao et al. "Efficient Matching for Web-Based Publish/Subscribe Systems," Cooperative Notes in Computer Science, vol. 1901, 2000, pp. 162-173.

Chand, R. and Felber, PA "A Scalable Protocol for Content-Based Routing in Overlay Networks," 2nd IEEE International Symposium on Network Computing and Applications, Apr. 18, 2003, pp. 123-130.

Aguilera, Marcos K. "Matching Events in a Content-Based Subscription System," Proceedings of the Annual ACM Symposium on Principles of Distributed Computing, 1999, pp. 53-61.

U.S. Appl. No. 11/385,368, Jul. 30, 2009, Non-Final Office Action.
U.S. Appl. No. 11/385,368, Jan. 28, 2010, Non-Final Office Action.
U.S. Appl. No. 11/385,368, Jul. 29, 2010, Final Office Action.
U.S. Appl. No. 11/385,368, Jun. 29, 2011, Notice of Allowance.
U.S. Appl. No. 11/385,368, Oct. 12, 2011 Notice of Allowance.
U.S. Appl. No. 13/401,525, Nov. 16, 2012, Non-Final Office Action.
U.S. Appl. No. 13/401,525, Mar. 22, 2013, Notice of Allowance.

* cited by examiner

MATCHING ENGINE FOR COMPARING DATA FEEDS WITH USER PROFILE CRITERIA

CROSS REFERENCE TO RELATED PATENTS AND APPLICATIONS

The present application is a continuation of U.S. patent application Ser. No. 13/401,525, filed Feb. 21, 2012, which is a continuation U.S. patent application Ser. No. 11/385,368, filed Mar. 21, 2006, which is now issued as U.S. Pat. No. 8,122,087. Each of the aforementioned patent(s) and application(s) are hereby incorporated by reference in their entirety.

BACKGROUND

1. The Field of the Invention

The present invention relates generally to matching algorithms for event notification. More specifically, the present invention relates to methods and systems for a computer system to use event matching tables and other matching techniques.

2. The Relevant Technology

The popularity of the Internet has profoundly improved the way people communicate by allowing users quick and easy access to information. By accessing the World Wide Web, using, for example, electronic mail and instant messaging, through computers and other devices, people now stay in touch with each other around the globe, and can access information on a virtually limitless variety of subjects.

In addition to facilitating communication between individuals, the Internet allows individuals (or devices) to be notified when an event of interest occurs. Event notification via the internet is often referred to as "alerts." A remote computer system will typically monitor for the event and automatically send a notification message to the user when the event occurs. This allows users to be aware of numerous important events that the user would not otherwise be aware of Traditional methods of notifying a user were developed using the Transmission Control Protocol ("TCP"), a well-known protocol already in use on the Internet.

Services are now able to deliver event notifications to a user via email, instant messaging, text messaging, handheld devices, among other delivery mechanisms. As consumers grow to expect a continual flow of information updates, the ability to efficiently supply the information becomes of increasing importance. The advent of event notification has allowed individual Internet users to customize the type of information they receive. Now, it is not uncommon for a subscriber to request customized information regarding stock quotes, weather reports, news items, sports scores, and other types of information, all in the form of event notifications. Furthermore, the subscriber can often specify to be notified of specific stock quotes, stock price movements (e.g., up 2%, or stock price=$19/share), specific sports teams, weather for a specific area, news items about a specific current event, and the like.

This increase in event notification popularity and functionality has also been accompanied by growing pains. Because of the complexity and volume of individual subscribers' notification requests in combination with the innumerable types of events that may occur, the ability to respond to all requests becomes computationally taxing.

One common method of responding to subscribers' requests includes comparing each new event to every request of every subscriber. When a match is found between an event and a subscriber, an event notification is sent to the subscriber via a designated delivery mechanism. Although this technique is fairly simple, it is very inefficient. Given that millions of "events" may occur each day, combined with potentially millions of unique subscriber notification requests, comparing all events to all unique subscriber notification requests can be a drain on computational resources.

It is important, with the ever increasing number of users sending data across the Internet, that event notification on the Internet is done as efficiently as possible. Accordingly, methods and systems are desired for streamlining the process of matching subscribers' notification requests to associated incoming events, which reduce computer processing time.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method of matching the occurrence of an event to subscriber requests for event notification. The method may be practiced, for example, in a computing system that includes a server system and a client system. The method includes creating a plurality of parent nodes within an event matching table. Each parent node may be assigned a unique subscriber request value, and may contain an identifier for one or more subscribers who have submitted requests to be notified at the occurrence of an event relating to the unique subscriber request value. Event data is received from a predetermined source, and is formatted to create one or more input values. One or more parent nodes are selected that has the subscriber request values corresponding to the one or more input values. The method may further include sending an alert to the one or more subscribers in each of the one or more selected parent nodes.

Another embodiment includes an event notification matching system. The system includes a preprocessing module, which may receive event data from a predetermined source and format the event data into one or more input values. The system may further include a computer-readable medium having an event matching table stored on the medium. The event matching table may form a plurality of parent nodes stored in a first region of a range of memory addresses in the computer-readable medium. Each parent node may be assigned a unique subscriber request value, and may contain identifiers for one or more subscribers to be notified at the occurrence of an event relating to the unique subscriber request value. The computer-readable medium may also include a table index stored in a table index region of the range of memory addresses. The table index receives the one or more input values from the preprocessing module and selects one or more of the parent nodes having subscriber request values corresponding to the received input values. The event notification of the matching system may further include an alert manager for managing alerts to be sent to each subscriber in the one or more selected parent nodes.

A further embodiment is directed to a method of generating an event matching table for efficiently matching the monitored event to a subscriber, so as to preserve the processing capacity of the server system. This method may be practiced, for example, in a server system in a network that includes the server system and a client system. The server system may monitor the occurrence of events, and may send notification data to the client system, when notification has been requested, after one of the monitored events occurs. The method may include receiving a subscriber request from a user of the client system, and formatting the subscriber request into one or more subscriber request values. If one of the nodes already existing within the event matching table is assigned to the one or more subscriber request values of the subscriber's request, a user identifier is added to the existing node. However, if none of the nodes within the event matching table are assigned to the one or more subscriber request values of the subscriber's request, a new node is created within the event matching table, and the user identifier is added to the new node. The event matching table is comprised of a plurality of nodes, where each node is assigned a unique subscriber request value and contains user identifiers for one or more users who have submitted requests to be notified at the occurrence of the monitored event relating to the unique subscriber request value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF VARIOUS EMBODIMENTS

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The present invention extends to methods, systems, and computer program products for efficiently determining whether to notify subscribers of the occurrence of events that may be of interest to the subscribers. The embodiments of the present invention may comprise a special purpose or general-purpose computer including various computer hardware, as discussed in greater detail below.

Embodiments of the present invention provide for a data structure for streamlining the process of matching the occurrence of events to a group of subscriber requests. Following the occurrence of an event, an event processor evaluates and formats the event to prepare the event data for submission to an event matching table. The event matching table is divided into a plurality of nodes, where each node is dedicated to a unique subscriber request value. Each node contains the identities of all subscribers who are interested in receiving an "alert", or "event notification", regarding the occurrence of an event relating to the subscriber request value assigned to the node. Therefore, when an event occurs having data related to the subscriber request value assigned to a specific node, the subscribers listed in that node will receive a notification of the occurrence of the relevant event. The event matching table is configured so that the monitored events need not be compared to each subscriber, or even each node. Instead, the event processor and event matching table are configured to select the appropriate node without comparing each event to each subscriber or node. Eliminating the need to compare each monitored event to each subscriber or node reduces the amount of processing resources and time needed to transmit notification requests to event notification subscribers.

Figure 1:
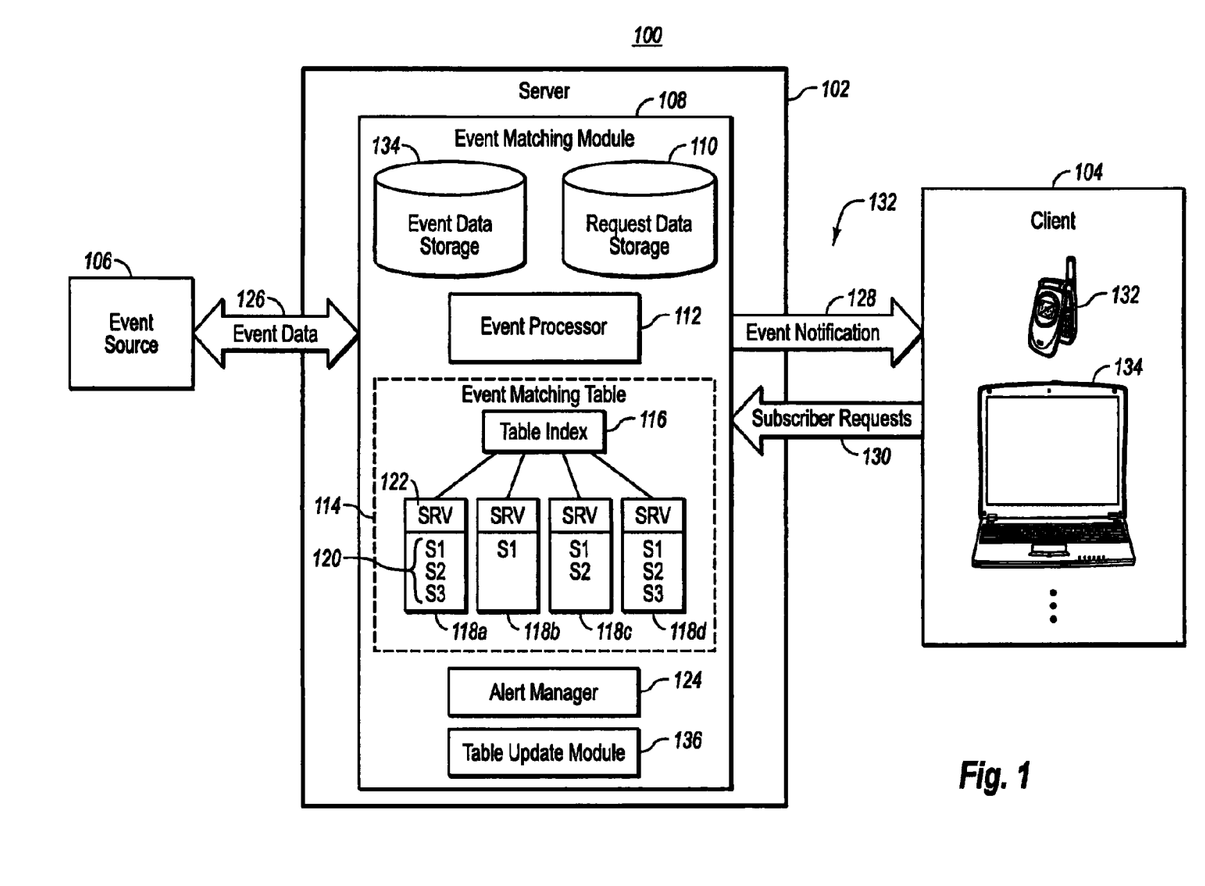
FIG. 1 is a schematic drawing that illustrates an architecture having a server providing an event matching service to one or more clients.

Referring now to FIG. 1, a more detailed example will be illustrated using a diagrammed reference to a computing system 100. The computing system 100 as shown includes a server system 102 that may include various services that can be provided to clients within a computer network. System 100 further includes one or more client systems 104 located at local sites. Client systems 104 are connected to server 102 by a link 132. System 100 further includes an event source 106 for supplying event data to the server 102 over link 126.

In the example shown in FIG. 1, the server 102 includes an event matching module 108 for managing requests from subscribers and for sending event notifications to subscribers regarding the occurrence of events of interest to the subscribers. The event matching module 108 receives subscriber requests 130 over link 132 from one or more clients 104. As illustrated in FIG. 1, clients 104 may include handheld devices 132, computers 134, among other devices capable of receiving event notifications from a server 102.

The subscriber requests 130 may vary widely depending on the preferences of the subscriber (i.e., the user of a client system 104), the interface being used by the subscriber, among other factors. Subscriber requests 130 may include any data relating to the occurrence of an event of which the subscriber wishes to be notified. By way of example, subscriber requests 130 may include requests for notification of an event such as:

Stock XYZ changes by 2%;
Stock XYZ exceeds $15/share;
News relating to war in country X;
Sports scores for team X;
Sports scores when team X loses;
etc.

As will be appreciated, subscriber requests 130 may include any number of unique requests, and are not limited to current events.

Upon receiving the subscriber requests 130, the event matching module 108 may optionally store the subscriber request 130 in a request data store 110. The request data store 110 may hold the subscriber requests to be accessed at a later time, or may be used as a buffer when a flood of subscriber requests are received and cannot be immediately attended to.

Upon receiving the subscriber requests, the event matching module 108 adds the subscribers who submitted the requests to an event matching table 114. Event matching table 114 has properties that are similar to a hash table, in that it includes a plurality of nodes 118a, 118b, 118c, 118d, and the like. Each node is assigned a unique subscriber request value (shown as "SRV") 122 that is used to identify a common event and identify the subscribers interested in being informed about the common event. The subscriber request value 122 may be comprised of any type of identifying feature, such as an address, an identifying code, text, and the like. The subscriber request values 122 are formatted such that an efficient comparison or match can be made between the subscriber request value and a monitored event, as will be further described below. Note while the term "match" or "matching" is often used in reference to the comparison between two or more variables, the term "match" should not be narrowly construed to require that all of the elements of a first variable are identical to all of the elements of a second variable. The term "match" broadly includes any variety of techniques for determining if the properties from a first variable relate to the properties of a second variable.

Each node 118a-118d also contains one or more identifiers 120 for subscribers who have expressed interest in receiving an event notification for the monitored event identified by the unique subscriber request value 122 assigned to the particular node 118a, 118b, 118c, 118d, etc. Although the example in FIG. 1 only illustrates an event matching table 114 having four nodes 118a, 118b, 118c, 118d, an actual event matching table may include hundreds, thousands, or even millions of nodes, each node assigned a unique subscriber request value 122.

A matching table update module 136 determines to which node 118 within the event matching table 114 the subscriber should be included. To make this determination, the event matching module 108 analyzes the subscriber request 130 submitted by the subscriber 104 and translates the subscriber request into a corresponding subscriber request value 122. Translating the request may require searching in a look-up table, performing a keyword search, or formatting the subscriber request to convert the subscriber request into a subscriber request value 122 format. If the identified subscriber request value 122 has already been assigned to an existing node, the identifier 120 for the subscriber 104 who submitted the subscriber request 130 is added to the existing node. Otherwise, a new node is created having a subscriber request value 122 that is unique to the submitted subscriber request 130 received from client 104. The identifier 120 for the subscriber is then added to the newly created node.

Converting the subscriber request 130 into the format of a subscriber request value 122 may be simplified by customizing the user interface used by the subscriber to submit subscriber requests such that the data transmitted from the client 104 to the server 102 is already in the subscriber request value format. In this case, a quick search can be made to determine if a matching subscriber request value 122 exists in the event matching table 114, or if a new node should be created having a new subscriber request value 122.

The server system 102 is configured to monitor for the occurrence of events. The event data 126 may be communicated to the server 102 from an event source 106. Note that the terms "event data", "monitored events", "events", and the like, are used herein interchangeably. Alerts may be triggered by any type of event data 126 received from the event source 106. The event source 106 may include any number of data generation sources, such as a client computer, a server system, a web page, a human, a news source, among other sources. By way of example and not limitation, event data 126 may include really simple syndication ("RSS") feeds, stock quotes, sports scores, news headlines, status reports, and the like. The event data 126 may optionally be stored within an event data store 134 for later use by the event matching module 108, or buffered in event data store 134 when a flood of event data is received and cannot be immediately attended to.

The event processor 112 formats the event data 126 in preparation for sending the data to the event matching table 114. The event data 126 is often complex and formatted in a way that makes comparison to the subscriber requests difficult. Therefore, the event processor 112 simplifies the event data 126, and formats the data in a way that reduces the amount of work required by the event matching table 114. The event processor 112 generates one or more input values that can be sent to the event matching table 114.

The manner in which the event processor 112 formats the data may vary, depending on the topic of the event data 126 and of the subscriber request values 122 in event matching table 114. For example, the event data 126 may provide that the closing price of a stock XYZ is $19 per share. The event processor 112 may convert the stock price into a percentage change from the closing price of the previous day (e.g., XYZ=+2%) to simplify the work done by the event matching table. Therefore, the input values to be sent to the event matching table 114 might include XYZ=19 and XYZ=+2, among other related information. As another example, the input data 126 may include a news headline such as "President to Speak in Israel." The processor may convert this headline into input values representing "president" and "Israel."

Once the event processor has formatted the event data 126, the input values are sent to the event matching table 114. Furthermore, the event processor 112 may format the data to the format required by table index 116 so that the table index 116 may quickly route the data to the correct node 118. Table index 116 routes the input values to the correct nodes 118. The table index 116 may employ a variety of techniques for routing the input values to the correct nodes 118, including the use of a hash function which hashes the input values to the correct node 118. The technique employed by the table index 116 avoids the need to compare the input values to each node 118. Instead, the table index 116 selects the correct node(s) without performing a comparison to any other non-selected nodes. The selection method may include selecting the node(s) having a subscriber request value 122 matching the input values provided by the event processor 112.

In one embodiment, the table index 116 could be combined with the table update module 136 to both create and update nodes 118 subscriber requests and also to match the incoming events to the existing nodes. In an alternative embodiment, table index 116 and/or table update module 136 may be included as part of the event processor 112.

As illustrated in FIG. 1, each node 118 may include an identifier for one or more subscribers 120 (e.g., S1, S2, S3, etc.). Each subscriber within a node has previously submitted a common request to be notified upon the occurrence of an event related to the subscriber request value 122 of their node. The process for submitting subscriber requests is described above. The subscriber identifiers 120 may include the name of a subscriber, contact information for the subscriber (e.g., email address, instant messaging address, telephone number, and the like), or any other symbol or variable that can be used to identify the subscriber who submitted a subscriber request.

When a node 118 is identified by the table index 116, an "alert" or event notification 128 is sent to each subscriber whose identifier is located within the selected node. The event notification may be sent in any format, such as by email, instant messaging, recorded telephone or Voice over Internet Protocol (VoIP) message, a text message, an RSS feed, and the like. The data included within the event notification may include a simple subject matter, a web link to more information, recorded audio data, or any other information that has been or may be sent via "alerts" or event notification. The sending of event notifications may be managed by an alert manager 124. The alert manager may store all data relevant to sending event notifications, including the list of subscribers or selected nodes and the data to be sent to the subscribers within the selected nodes.

Figure 2:
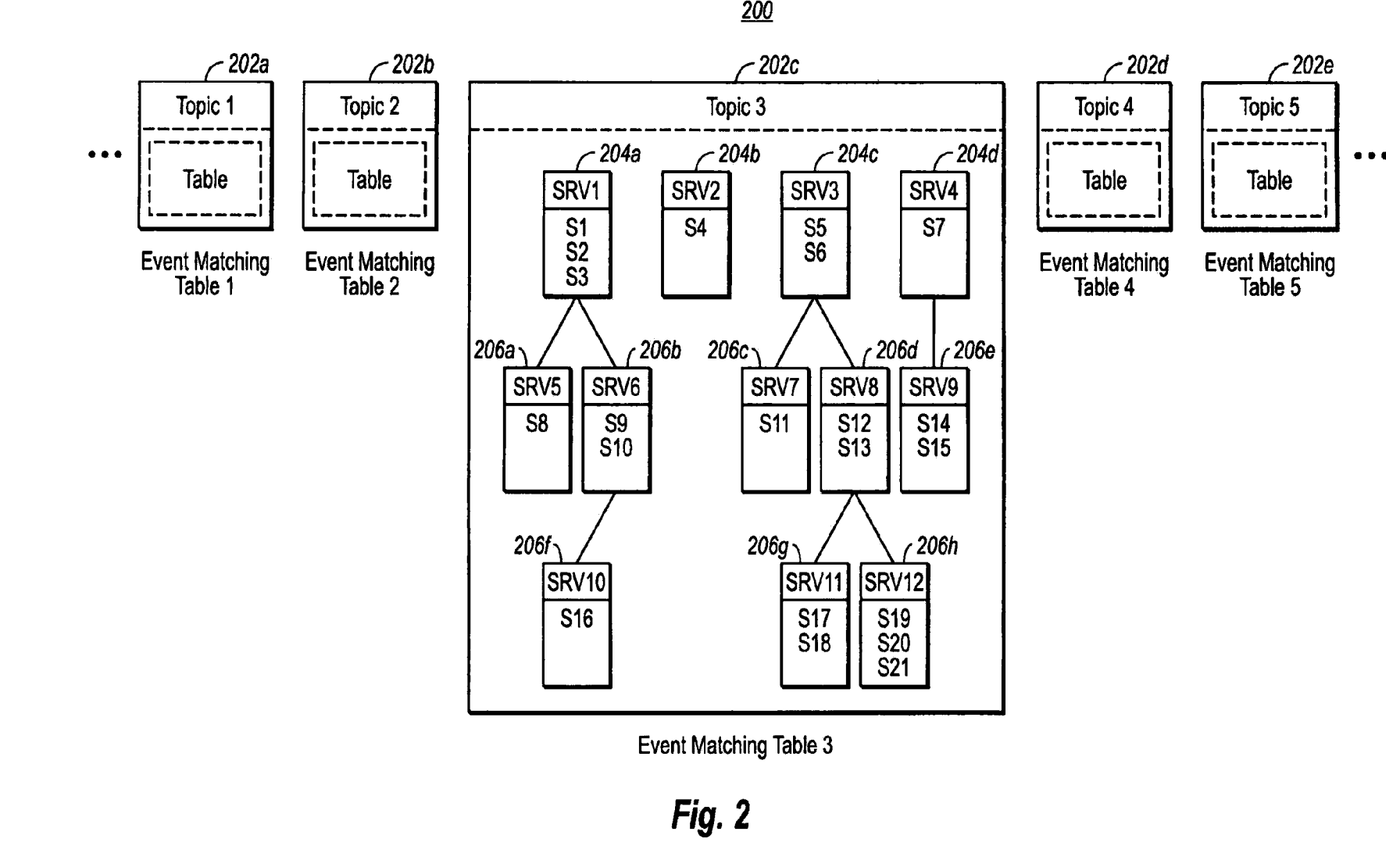
FIG. 2 is a block diagram of one embodiment of an event matching table for matching subscriber requests to monitored events.

Referring now to FIG. 2, a more detailed depiction is provided of event matching tables of an event matching module 200, according to one embodiment of the present invention. As illustrated in FIG. 2, the present invention may include a plurality of event matching tables 202a, 202b, 202c, 202d, and 202e, each table dedicated to event data relating to a unique topic. Although FIG. 2 only shows five different event matching tables, an actual implementation of the present invention may include many more matching tables 202, depending on the number of unique topics being handled by the event matching module 200. Where a table index 116 is used, as illustrated in FIG. 1, each table 202 may include a separate table index 116.

Dividing the event matching module 200 into multiple event matching tables 202 simplifies and minimizes complexity, size, and the amount of work performed by each table 202. Topics that may be assigned to each event matching table 202 include, for example, News, Sports, Financial, Personal, Health, Science, Weather, and the like. Furthermore, the above named topics may further be broken down into sub-topics, each sub-topic assigned to a separate event matching table 202. For example, the "News" topic may be broken down into separate tables for "Political News", "Entertainment News", "Current Events", and the like. Likewise, the "Financial" topic may be broken down into separate tables for individual stock tickers, and the like.

The event matching table 202c provides a more detailed illustration of the architecture of an event matching table. The event matching table 202c is dedicated to a topic labeled "Topic 3", and includes parent nodes 204a-204d, and sub-nodes 206a-206h. Each sub-node is linked to either another sub-node 206 that is higher in the hierarchical organization, or to a parent node 204. Each sub-node is assigned a subscriber request value (labeled SRV5-SRV12) and contains an identifier for all subscribers that are located within the sub-node. In one embodiment, the event matching table 202 may include a single layer of sub-nodes 206, wherein each sub-node 206 is linked to one of the parent notes 204. Alternatively, as is illustrated in FIG. 2, the event matching table 202 may include multiple layers of hierarchically linked sub-nodes 206, each sub-node ultimately being linked to a parent node 204.

The subscribers located in the parent nodes 204 are those who have requested to be notified at the occurrence of any event that relates to the subscriber request value of the parent node 204 wherein the subscriber resides. However, the subscribers located in the sub-nodes 204 are those who have requested to be notified at the occurrence of only those events relating to both the subscriber request value of the parent node and/or sub-nodes to which they are linked and to the subscriber request value of the sub-node wherein the subscriber resides.

To further illustrate the above description, an example will be provided. Suppose there are group of subscribers who are all interested in the status of a stock having ticker symbol XYZ. Some subscribers would like to be notified when the XYZ stock goes up in price by 3% within a single day. Other subscribers would like to be notified when the XYZ stock hits a price of $19 per share. Another group of subscribers would like to be notified of the stock price only at the end of each yearly quarter. To further complicate matters, some subscribers only want to be notified if the stock is up 3% and exceeds $19 per share, while other subscribers only want to be notified when the stock exceeds $19 per share at the end of a yearly quarter. As will be appreciated, the permutations on any one topic can be innumerable, and the process of matching each subscriber request to each monitored event can be daunting.

To efficiently deal with the above scenario, the present invention places each of the above subscribers into a node 204 or 206 within an event matching table 202c dedicated exclusively to the stock ticker XYZ (i.e., "Topic 3"=XYZ). The nodes wherein the subscribers are placed are each assigned a subscriber request value relating to each subscriber's request. For example, the parent node 204a may have a subscriber request value (SRV1) relating to a change of +3%, where subscribers S1, S2, and S3 are those subscribers who are interested in receiving a notification any time the XYZ stock goes up by 3%. The parent node 204b may have a subscriber request value (SRV2) relating to a price that exceeds $19 per share, where subscriber S4 is a subscriber who is interested in receiving a notification any time the XYZ stock exceeds $19 per share. The parent node 204c may have a subscriber request value (SRV3) relating to quarterly updates, where subscribers S5 and S6 are those subscribers who are interested in receiving a notification at the end of every quarter.

The sub-nodes 206 are provided for subscribers who are only interested in receiving a notification upon the occurrence of two or more events. For example, the sub-node 206b may have a subscriber request value (SRV6) relating to a price that exceeds $19 per share, where subscribers S9 and S10 are subscribers who are only interested in receiving a notification when the XYZ stock both exceeds $19 per share and goes up by 3%. Likewise, the sub-node 206f may have a subscriber request value (SRV10) relating to a trade volume of the XYZ stock that exceeds $1 million, where subscriber S16 is a subscriber who is only interested in receiving a notification when the XYZ stock goes up by 3%, exceeds $19 per share, and also exceeds $1 million in trade volume. The other nodes 204 and sub-nodes 206 may be assigned subscriber request values to address all other subscriber requests that may arise.

As will be appreciated, the example provided in FIG. 2 is a simplified rendition of an architecture that may have innumerable permutations. However, by breaking the problem up into individual event matching tables 202a-202e, and by further breaking the problem down into parent nodes 204a-204d and sub-nodes 206a-206h, the task of matching monitored events to subscriber requests can be performed in an efficient manner. This is particularly true because, as described above, the nature of each event matching table is such that the monitored events do not need to be compared to each subscriber request, or even each node. Instead, each input value produced by the event processor 112 is automatically matched to a single parent node without having the requirement of comparing the input value to any other non-selected nodes (note that where there are multiple input values, an equal number of parent nodes will be selected). Once a parent node is selected, the event matching table quickly finalizes the matching process by only selecting those sub-nodes having subscriber identifiers who are interested in receiving notification of events relating to the subscriber request value of the originating parent node and the sub-node wherein the subscribers are residing.

The manner in which the sub-nodes 206 are arranged in relation to the parent nodes 204 may vary in order to improve the efficiency of the event matching table 202 and to eliminate the creation of redundant nodes within the event matching tables 202. In the absence of an anti-redundancy configuration, a possibility exists that the subscriber request value combinations of a two different parent node/sub-node pairs could match, which could result in the transmission of redundant event notifications to a single subscriber. For example, the parent node/sub-node pair 204a/206a could have a subscriber request value combination that matches that of parent node/sub-node pair 204c/206d, where SRV1=SRV7, and where SRV3=SRV5. To eliminate this possibility, the table update module 136 may perform a series of anti-redundancy checks prior to linking a sub-node 206 to a parent node 204 to ensure that a duplicate parent node/sub-node pair is not being created. By eliminating duplicate parent node/sub-node pairings, the possibility of sending duplicate alerts to a single subscriber is also eliminated.

The above anti-redundancy configuration may further be refined for improving the efficiency of the event matching table 202. In one embodiment of the invention, when a sub-node is created that could potentially be linked to two different parent nodes, the sub-node is linked to the parent node having a subscriber request value that is least likely to occur. For example, assume that subscribers S5 and S6 have requested to receive notification upon the occurrence of an event regarding "Tom." Further assume that subscriber S7 has requested to receive notification upon the occurrence of an event regarding "Mary." Therefore, S5 and S6 are placed in node 204c, where SRV3=Tom, and S7 is placed in node 204d, where SRV4=Mary. Next, assume two new subscribers S14 and S15 are interested in receiving notification upon the occurrence of an event regarding "Mary" and "Tom." The sub-node created for subscribers S14 and S15 could potentially be linked to either parent node 204c or 204d. If the new sub-node were linked to parent node 204c, its SRV would be "Mary" to create a "Tom" and "Mary" combination. Conversely, if the new sub-node were linked to parent node 204d, its SRV would be "Tom", to create a "Mary" and "Tom" combination. Finally, assume that it has been predetermined that an event regarding Mary (SRV4) is less likely to occur than an event regarding Tom (SRV3). Therefore, in accordance with the present embodiment, the new sub-node (206e) will be linked to the parent node 204d (the parent node having a subscriber request value that is less likely to occur), where the subscriber request value of the new sub-node (SRV9) is "Mary". By linking the new sub-node to the parent node having a subscriber request value that is less likely to occur, the probability that the event matching table 202c will be required to check the new sub-node in the future has been reduced. In other words, if the event processor 112 produces input values "Tom" and "Mary", then both nodes 204c and 204d will be triggered, as will node 209e. However, in the more likely event that the event processor 112 only produces the input value "Tom", only node 204c will be triggered, thus eliminating the need to check node 204e. In certain tests, the matching algorithm of the present invention performed up to five times faster when the sub-nodes were organized in accordance with the above technique as compared to when the sub-nodes were randomly organized.

The process for determining the likelihood of occurrence of subscriber request values may be based on a number of factors such as the frequency of past and present event types, the number of subscribers in each node, and the like.

Figure 3:
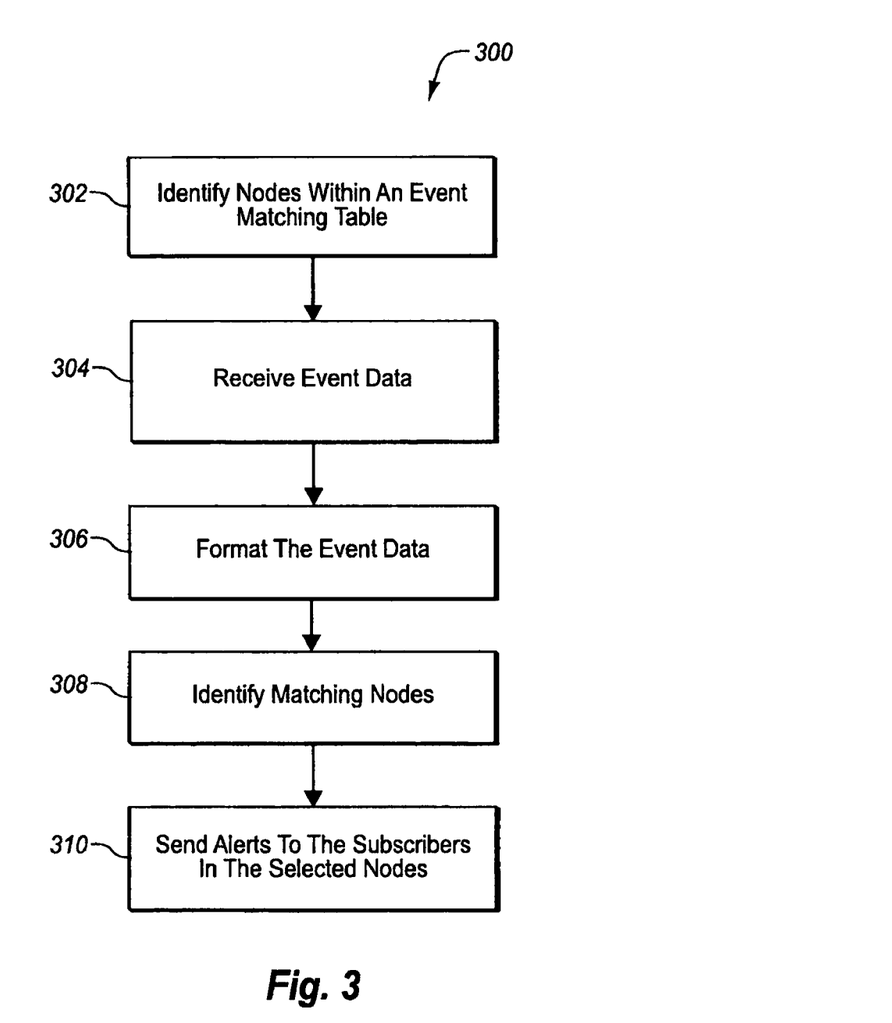
FIG. 3 is a flow diagram of a method for matching the occurrence of an event to subscriber requests for event notification.

Referring now to FIG. 3, a method 300 of matching the occurrence of an event to user requests for event notification is illustrated. The method 300 may be practiced, for example, in a computing system including a server system and a client system, such as that illustrated in FIG. 1. Method 300 includes, at 302, identifying a plurality of parent nodes within an event matching table. Each parent node is assigned a unique subscriber request value, and includes an identifier for one or more subscribers who have submitted requests to be notified at the occurrence of an event relating to the unique subscriber request value. For example, FIG. 1 illustrates an event matching table 114 having a plurality of parent nodes 118a-118d.

In one embodiment creating a plurality of parent nodes within an event matching table may include creating one or more links from one or more parent nodes to one or more sub-nodes. Each sub-node may be assigned a subscriber request value, and may contain an identifier for each subscriber who has submitted an event notification request regarding the occurrence of an event relating to both the subscriber request value of the parent node and the subscriber request value of the sub-node. For example, and referring now to FIG. 2, parent nodes 204a, 204c, and 204d each include one or more links to one or more sub-nodes 206. Each sub-node 206 is assigned a subscriber request value SRV5-SRV12. The subscribers located in the sub-nodes 206 include subscribers who are interested in receiving event notifications regarding the subject matter (i.e., subscriber request values) of both the sub-node wherein they are residing and of the parent node to which they are linked.

In one embodiment, creating a plurality of parent nodes within an event matching table may further include creating a plurality of event matching tables, each table dedicated to event data relating to a unique topic. Referring again to FIG. 2, any number of events matching tables 202 may be created, each event matching table 202 dedicated to a unique topic in order to simplify the matching of event data to subscriber requests.

At 304, the method 300 further includes receiving event data from a predetermined source. As shown in FIG. 1, the predetermined source (i.e., event source 106) may include an online data source, a manual data entry source, or any number of event publication sources.

At 306, the method 300 further includes formatting the event data to create one or more input values. Thus, as depicted in FIG. 1, the event processor 112 may format the event data 126 received from the event source 106 into a format that can be easily managed by the event matching table 114.

At 308, the method 300 further includes identifying one or more parent nodes having subscriber request values that correspond to the one or more input values. As described above, this process is very efficient because the event matching table is configured such that a node can be selected without being required to compare each input value to each subscriber request value. In one embodiment, illustrated in FIG. 1, the process of selecting the parent node is performed by the table index 116.

In one embodiment, where two or more input values are produced, 308 may further include determining if the selected parent nodes contain links to one or more sub-nodes having a subscriber request value that matches one of the two or more input values. The subscribers identified in the selected sub-node are those who have submitted requests to be notified at the occurrence of an event relating to the subscriber request values of both the sub-node and of the parent node to which they are linked, as is illustrated FIG. 2.

Where a parent node is linked to two or more sub-nodes, as is illustrated by parent node 204c of FIG. 2, 308 may include searching each sub-node linked to the selected parent node starting with the sub-node assigned to a subscriber request value that is least likely to occur and ending with the sub-nodes assigned to a subscriber request value that is most likely to occur.

In one embodiment, selecting one or more parent nodes may further include determining a topic for the event data, and selecting an event matching table dedicated to the topic of the received event data.

At 310, the method 300 further includes sending an alert to the one or more subscribers in each of the one or more selected parent nodes and/or sub-nodes. As illustrated in FIG. 1, the sending of event notifications 128 may be managed by the alert manager 124.

The method 300 may further include creating the event matching table. For example the method 300 may include receiving a new subscriber request from a requesting subscriber. Referring again to FIG. 1, the subscriber may be a user of a client of 104 and may send the subscriber requests 130 over a data link 132. Once the new subscriber request has been received, the method 300 may further include updating the event matching table to include the new subscriber request information.

More particularly, updating the event matching table may further include formatting the new subscriber request to create a new subscriber request value. As illustrated FIG. 1, the formatting of the new subscriber request may be performed by the event matching table update module 136. If no node within the event matching table is assigned the new subscriber request value, a new node may be created within the event matching table having the new subscriber request value. Upon creating a new node, a new identifier identifying the requesting subscriber may be added to the new node. However, if an existing node within the event matching table is already assigned the new subscriber request value, the new identifier identifying the requesting subscriber may be added to the existing node.

Figure 4:
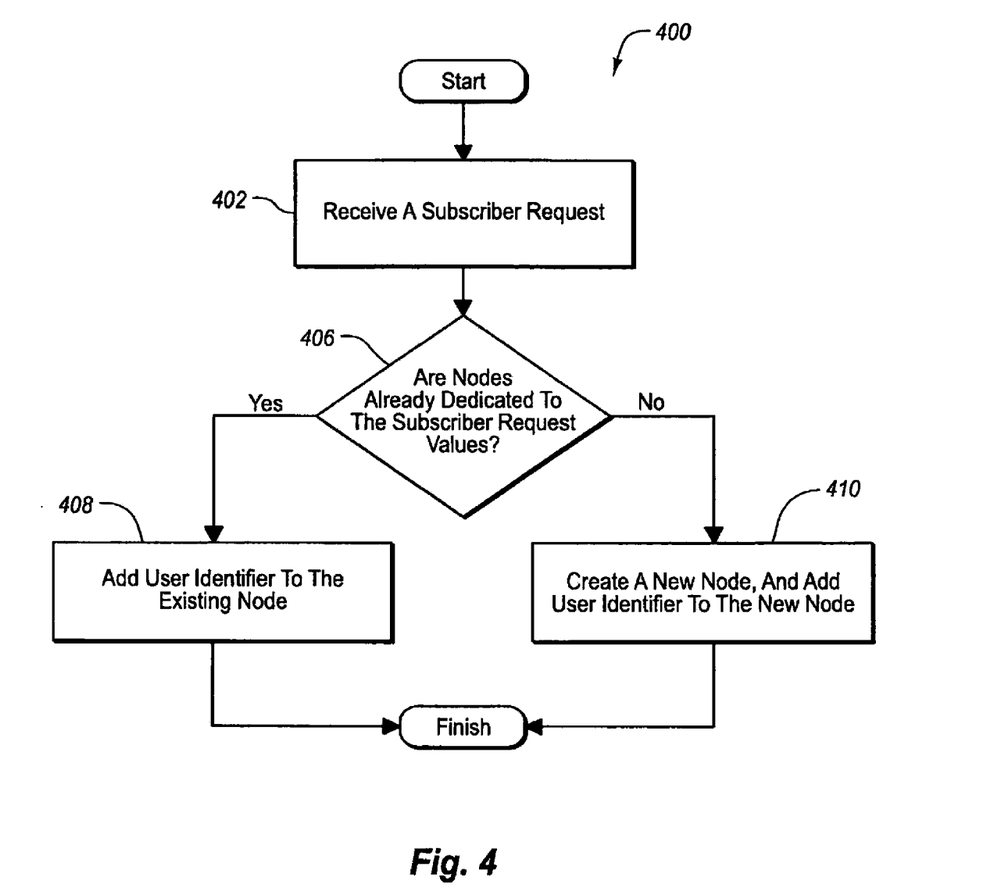
FIG. 4 is a flow diagram of a method for generating an event matching table for efficiently matching the monitored event to a subscriber.

Referring now to FIG. 4, a method 400 is illustrated for generating an event matching table for efficiently matching the monitored event to a subscriber, so as to preserve the processing capacity of the server system. The method 400 may be practiced, for example, in a server system within a network that includes the server system and a client system. The server system may be configured to monitor the occurrence of events and to send notification data to the client system that has requested to be notified after one of the monitored events occurs. The server system may include one or more computer-readable media having computer-executable instructions, that when executed, implement the method 400. The server system may further include an event processor 112, as shown in FIG. 1, for receiving the monitored events and for formatting the event data into the appropriate format.

The method 400 includes, at 402, receiving a subscriber request from a user of the client system. At 406, the method 400 further includes making the determination of whether one of the nodes within the event matching table is already dedicated to the one or more subscriber request values. If such a node already exists, at 408, the method 400 further includes adding a user identifier to the node for identifying the user who submitted the subscriber request.

If a determination was made, at 406, that none of the nodes within the event matching table are assigned to the one or more subscriber request values, at 410, the method 400 further includes creating a new node within the event matching table and adding the user identifier to the new node.

As previously described, the event matching table referred to in the method 400 includes a plurality of nodes, where each node is assigned a unique subscriber request value and further contains user identifiers for one or more users who have submitted requests to be notified at the occurrence of the monitored event relating to the unique subscriber request value. The event matching table may be comprised of parent nodes and sub-nodes, where each sub-node is linked to a parent node or sub-node. The parent nodes contain user identifiers for one or more subscribers who have submitted requests to be notified at the occurrence of a monitored event relating to the unique subscriber request value of the parent node. The sub-nodes contain user identifiers for one or more subscribers who have submitted requests to be notified at the occurrence of a monitored event relating to the unique subscriber request value of the parent node and to the unique subscriber request value of the sub-node. In order to improve the efficiency of the method 400, the event matching table may be configured and each node is configured to be accessed upon the occurrence of the monitored event relating to the unique subscriber request value without indexing other nodes The method 400 may further include selecting one event matching table amongst a plurality of event matching tables, where each event matching table is dedicated to events relating to a unique topic.

The following example is a test case that was run using the principles described in the above embodiments. An average length RSS feed was received having 1000 characters. More than 2 million subscribers had submitted requests to be notified of the occurrence of events of interest to them. Identifiers for each of the subscribers were placed in nodes within event matching tables, in accordance with the present invention, resulting in over 2.1 million nodes and sub-nodes, having 820,000 distinct subscriber request values. The RSS feed was fed to the event matching tables, and was matched to the appropriate nodes containing identifiers for subscribers interested in receiving event notification regarding the RSS feed. The process of determining which subscribers should be notified regarding the RSS feed using a 3.2 GHz computer took approximately 300 microseconds (i.e., 0.0003 seconds) to complete. A similar test was performed using a conventional comparison method, where every subscriber was compared to the contents of the RSS feed. The process of determining which subscribers should be notified regarding the RSS feed using the conventional comparison technique using the same computer took approximately eight seconds to complete, i.e., more than 26,000 times longer.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a request from a user to receive a notification if an event occurs;
   translating, using at least one processor, the request into a request value;
   receiving event data relating to occurrence of events;
   formatting the event data into input values;
   identifying, using at least one processor, if any of the input values match the request value by comparing the input values to only a subset of request values; and
   if the input value matches the request value, sending the notification to the user.

2. The method as recited in claim 1, wherein the request value is a unique value.

3. The method as recited in claim 1, wherein identifying if any of the input values match the request value comprises determining if a single input value matches the request value.

4. The method as recited in claim 3, wherein identifying if any of the input values match the request value excludes comparing the input values to request values that do not match any of the input values.

5. The method as recited in claim 1, further comprising linking an identifier associated with the user to the request value.

6. The method as recited in claim 5, further comprising:
   receiving an additional request from an additional user to receive an additional notification if the event occurs;
   linking an additional identifier associated with the additional user to the request value; and
   sending the notification to each user associated with identifiers linked to the request value upon determining that the input value matches the request value.

7. The method as recited in claim 6, wherein the additional request differs from the request.

8. The method as recited in claim 1, further comprising maintaining an event matching table organizing nodes into a hierarchy, the hierarchy including:

a plurality of parent nodes including a first parent node being associated with the request value and a group of one or more users who have requested to be notified at an occurrence of the event; and
   a plurality of sub-nodes, at least one sub-node being linked to a parent node of the plurality of parent nodes, the at least one sub-node being associated with an event that is predicated on the occurrence of an event associated with the parent node.

9. The method as recited in claim 8, wherein if a sub-node can be linked to two or more parent nodes to form a duplicate request value combinations, linking the sub-node to the parent node associated with a request value that is least likely to occur.

10. A system comprising:
    at least one processor; and
    at least one non-transitory computer readable storage medium storing instructions thereon that, when executed by the at least one processor, cause the system to:
       receive a request from a user to receive a notification if an event occurs;
       receive event data relating to occurrence of events;
       translate the request into a request value;
       format the event data into input values;
       identify if any of the input values match the request value by comparing the input values to only a subset of request values; and
       send the notification to the user if the input value matches the request value.

11. The system as recited in claim 10, wherein identifying if any of the input values match the request value comprises determining if a single input value matches the request value.

12. The system as recited in claim 11, wherein the request value is a unique value.

13. The system as recited in claim 12, wherein identifying if any of the input values match the request value excludes comparing the input value to request values that do not match the input value.

14. The system as recited in claim 13, further comprising instructions that when executed cause the system to link an identifier associated with the user to the request value.

15. The system as recited in claim 14, further comprising instructions that when executed cause system to store an event matching table organizing nodes into a hierarchy, the hierarchy including:
    a plurality of parent nodes including a first parent node being associated with the request value and a group of one or more users who have requested to be notified at an occurrence of the event; and
    a plurality of sub-nodes, at least one sub-node being linked to a parent node of the plurality of parent nodes, the at least one sub-node being associated with an event that is predicated on the occurrence of an event associated with the parent node.

16. The system as recited in claim 15, wherein if a sub-node can be linked to two or more parent nodes to form a duplicate request value combinations, linking the sub-node to the parent node associated with a request value that is least likely to occur.

17. A method comprising:
    receiving requests from users to receive notifications upon occurrence of events;
    translating the requests into request values;
    receiving event data relating to the occurrence of events;
    formatting the event data into input values;

identifying, using at least one processor, matches between the input values and the request values by comparing the input values to a subset of request values;

sending notifications to users associated with request values that match input values.

18. The method as recited in claim 17, further comprising maintaining an event matching table organizing nodes into a hierarchy, the hierarchy including:

a plurality of parent nodes including a first parent node being associated with the request value and a group of one or more users who have requested to be notified at an occurrence of the event; and a plurality of sub-nodes, at least one sub-node being linked to a parent node of the plurality of parent nodes, the at least one sub-node being associated with an event that is predicated on the occurrence of an event associated with the parent node.

19. The method as recited in claim 18, wherein if a sub-node can be linked to two or more parent nodes to form a duplicate request value combinations, linking the sub-node to the parent node associated with a request value that is least likely to occur.

20. The method as recited in claim 18, further comprising maintaining a plurality of event matching tables, wherein each event matching table is dedicated to a unique topic.

* * * * *